United States Patent [19]

Cornell et al.

[11] 4,426,347

[45] Jan. 17, 1984

[54] METHOD OF MAKING COMPOSITE POLYOLEFIN BASED CONTAINERS

[76] Inventors: Stephen W. Cornell, 66 High Point Rd.; Don H. Johns, 20 Eno La., both of Westport, Conn. 06880

[21] Appl. No.: 251,581

[22] Filed: Apr. 6, 1981

[51] Int. Cl.³ ............................................. B29D 23/01
[52] U.S. Cl. .................................. 264/294; 264/255; 428/35
[58] Field of Search ............................ 264/294, 255; 260/42.53; 525/184, 324; 428/35

[56] References Cited

U.S. PATENT DOCUMENTS

| | | | |
|---|---|---|---|
| 3,093,255 | 6/1963 | Mesrobian et al. | 525/184 |
| 3,373,224 | 3/1968 | Mesrobian et al. | 525/184 |
| 3,453,173 | 7/1969 | Isley | 428/424.7 |
| 3,463,350 | 8/1969 | Unger | 220/83 |
| 3,464,546 | 9/1969 | Thomka | 206/524.3 |
| 3,668,038 | 6/1972 | Kirk et al. | 156/276 |
| 3,882,259 | 5/1975 | Nohara et al. | 428/516 |
| 3,923,190 | 12/1975 | Roth | 428/474.9 |
| 4,102,974 | 7/1978 | Boni | 260/42.56 |
| 4,109,037 | 8/1978 | Nohara | 428/35 |
| 4,122,147 | 10/1978 | Vrcelj | 264/255 |
| 4,126,647 | 11/1978 | Howard | 524/324 |
| 4,187,210 | 2/1980 | Howard | 260/42.53 |

Primary Examiner—James H. Derrington

[57] ABSTRACT

A polyolefin container having improved gas barrier properties is fabricated from particles of a solid material having low permeability to gases, the solid material being coated with an olefin polymer by polymerizing an olefin monomer in the presence of the solid material.

9 Claims, No Drawings

METHOD OF MAKING COMPOSITE POLYOLEFIN BASED CONTAINERS

BACKGROUND OF THE INVENTION

1. Technical Field

This invention relates to polyolefin containers and more particularly to polyolefin containers having improved gas barrier properties.

2. Prior Art

In the manufacture of canned foodstuffs, e.g., meat products such as ham, corned beef hash, chili and beef stew, vegetables such as green peas, green beans and corn, the containers, usually metal cans, are filled with the foodstuff, covered with a metal end closure and sealed.

Attempts to use certain inert synthetic resin materials, such as polyethylene and polypropylene for the canning of food stuffs, have encountered the disadvantage that such resin materials are excessively permeable to gases, such as oxygen, and the permeation of oxygen into the container causes an undesirable discoloration and a depreciation in the taste and qualities of the foodstuff.

The high gas permeability characteristics of olefin polymer resins, such as polyethylene and polypropylene, has resulted in containers fabricated from such resins being rejected in the packaging of oxygen sensitive comestibles where, due to the chemical inertness of the resin, these resins might otherwise be employed to great advantage.

The art has devised a number of ways to reduce the gas permeability of polyethylene and polypropylene resins. Included in these methods is the fabrication of the container from a thermoplastic resin wherein an inorganic mineral filler material such as clay or mica, or a gas impermeable resin such as saran is admixed with the olefin polymer resin and a container is molded from the mixture. Examples of this art include U.S. Pat. Nos. 3,463,350, 3,923,190 and 4,102,974.

In U.S. Pat. No. 4,122,147 there is described a preferred method for the manufacture of containers from filled polyolefin resins having improved gas barrier properties which are sealable with metal closures.

In the method disclosed in U.S. Pat. No. 4,122,147, the container is compression molded from a multilayer billet having a plurality of polyolefin layers, a first of these layers being comprised of a polyolefin resin composition exhibiting relatively high flexibility when molded, and a second of these layers being comprised of a polyolefin resin having incorporated therein a filler such as a mineral such as mica or a polymeric material such as saran or polyacrylonitrile, the presence of which reduces the gas permeability of the polyolefin resin. The first and second layers, when heated to a plasticized state and subjected to a compressive force, flow at non-uniform rates, the first layer flowing at a faster rate than the second layer.

In forming a container in accordance with U.S. Pat. No. 4,122,147, the billet is placed in a molding chamber and is compressed between a pair of die members with sufficient force to cause the layers of the billet to flow radially outward from between the die members at a differential rate into a mold cavity defining the sidewalls of the container. As the die members are advanced through the molding chamber, the faster flowing, more flexible, first layer is extruded into the mold cavity ahead of the remaining layers of the billet and forms the flange and exterior surface portions of the container whereas the slower moving second layers form the interior surface portions of the container.

The advancement of the die members through the molding chamber causes a continuous layer of multilayer material to be deposited and solidified within the mold cavity, the walls of which are maintained at a temperature below the solidification temperature of the extruded material. The extruded material, cooled to its solidification temperature, forms an integral solid hollow article having a multilayer side wall and bottom structure which is then ejected from the molding chamber.

Containers fabricated by the process of U.S. Pat. No. 4,122,147 from a polyethylene multilayer billet in which the second layer contains heavy loadings of mica, e.g., 40–50% by weight mica, when sealed with a metal end, have an oxygen leak rate when measured with a Mocon Oxtran 100 instrument of about 0.2 cc/100 in.$^2$ day at 73° F. When saran is used as a filler at 50% loadings, the oxygen leak rate when measured with the Mocon instrument is also about 0.1 cc 100 in.$^2$ day at 73° F.

It has been determined that containers generally require an oxygen leak rate of about 0.05 cc/100 in.$^2$ day at 73° F. or less in order to be considered for the packaging of oxygen sensitive foodstuffs, i.e., foods such as ham which require shelf-lives of about 18–24 months.

Although containers compression molded in accordance with the process of U.S. Pat. No. 4,122,147 have improved gas permeability, the gas permeability requirements for the most oxygen sensitive foodstuffs have still not been effectively met by polyolefin containers of the prior art.

SUMMARY OF THE INVENTION

In accordance with the present invention there is provided a process for the manufacture of polyolefin containers suitable for the packaging of foodstuffs requiring an extended shelf-life, the containers having substantially lowered permeability to gases wherein a billet is formed from solid thermoplastic particles consisting of a solid material such as a thermoplastic resin or mineral having a gas permeability lower than an olefin polymer, the solid material having been coated with an olefin polymer by polymerizing an olefin monomer in the presence of the solid material. Thereafter the billet is molded or otherwise shaped into a hollow container having walls exhibiting lowered permeability to the transmission of gases, particularly oxygen.

Polyolefin containers manufactured in accordance with the process of the present invention have sufficiently lowered gas permeabilities to permit their utilization for the packaging of oxygen sensitive foods which require extended shelf-lives.

PREFERRED EMBODIMENTS

The term "olefin polymer" includes within its meaning olefin polymers such as polyethylene, polypropylene, poly-1-butene, poly-4-methyl-pentene-1 and other homopolymers and copolymers of similar mono-1-olefins having up to 6 carbon atoms per molecule. Of these, high density (0.950–0.968) polyethylene and polypropylene (0.90–0.905) are preferred.

Solid thermoplastic particles having high gas barrier properties in the presence of which the olefin polymer may be polymerized include thermoplastic resin particles such as vinylidene chloride polymers, acrylonitrile polymers, nylon, vinyl alcohol polymers as well as inorganic mineral platey fillers such as clay, wollastonite and mica. These polymeric materials are presently known to the art to reduce the gas permeability of polyethylene, polypropylene and other polyolefin resins. For example, U.S. Pat. Nos. 3,453,173, 3,464,546, 3,615,308, 3,882,259 and 4,109,037 disclose containers fabricated from a laminate formed from a plurality of layers of thermoplastic material, one of the layers being formed from a thermoplastic resin which exhibits high gas barrier properties such as vinylidene chloride polymers, acrylonitrile polymers and vinyl alcohol polymers. U.S. Pat. Nos. 3,463,350 and 3,668,038 teach the incorporation of inorganic fillers such as clay and mica in olefin polymers to increase the gas barrier properties and U.S Pat. Nos. 3,093,255 and 3,373,224 teach incorporating nylon in olefin polymers to improve the gas barrier properties thereof.

The term "vinylidene chloride polymer" includes within its meaning vinylidene chloride homopolymers and copolymers of vinylidene chloride containing between 70 and 98% by weight polymerized vinylidene chloride with the remainder being any other monoethylenically unsaturated monomeric material which is copolymerizable with vinylidene chloride. Monomeric materials suitable for copolymerization with vinylidene chloride to prepare copolymers thereof include vinyl chloride, acrylonitrile, acrylic or methacrylic acid and their ester derivatives.

The term "vinyl alcohol polymer" includes within its meaning homopolymers of vinyl alcohol such as polyvinyl alcohol, copolymers of vinyl alcohol such as ethylene-vinyl alcohol.

The term "acrylonitrile polymer" includes within its meaning homopolymers of acrylonitrile and copolymers of acrylonitrile having an acrylonitrile content of at least 90% by weight. Examples of acrylonitrile polymers useful in the practice of the present invention are acrylonitrile/styrene copolymers and acrylonitrile/methyl methacrylate copolymers.

The term "nylon" as used in the present specification and claims means a long-chain synthetic polymeric amide which has recurring amide groups as an integral part of the main polymer chain separated by alkylene groups containing at least 2 carbon atoms.

Among the nylons which can be coated with an olefin polymer in accordance with the practice of the present invention are polypentamethylene sebacamide, polyhexamethylene adipamide (Nylon 66), polyhexamethylene nonanamide (Nylon 69), polyhexamethylene sebacamide (Nylon 610), polydecamethylene adipamide, polydecamethylene sebacamide, poly-m-phenylene sebacamide, polycaproamide (Nylon 6), poly-7-heptanoamide (Nylon 7), poly-11-undecanoamide (Nylon 11) and polylauryl lactam (Nylon 12).

In the preparation of the olefin polymer coated high gas barrier solid particles of the present invention, the polymer is formed or polymerized directly in the presence of the high gas barrier solid particles to either coat or encapsulate each of the particles. Each solid particle maintains its individual identity throughout the process, there being little, if any, interconnecting or agglomerating of the particles during the polymerizing process. Thus, each of the high gas barrier solid particles is coated or surrounded by an individual shell of olefin polymer, the product formed by the process being a granular material having a particle size substantially proportional to the original size of the original high gas barrier particles.

The high gas barrier particles may be of any desired size, and are treated with a catalytic agent in accordance with the invention to form active sites on the particles. Desirably the size of high gas barrier resin and mineral particles range from 50 to 500 microns and preferably from 75 to 350 microns.

The catalyst, barrier particle and monomer can be mixed in any desired order. One preferred order of mixing the reactants is to coat the barrier particles with one of the catalyst components, followed by the addition of a second catalyst component. The polymerizable olefin monomer is then added to this mixture. A suitable alternative would be to prepare the catalyst mixture separately and coat the barrier particles with the catalyst mixture. To this mixture is then added the olefin monomer. The olefin monomer is bubbled through the reaction mixture of the catalytically treated barrier particles and the monomer is polymerized onto the surface of each of the particles and formed thereon. The in situ formation of the polymer on the high gas barrier particles is substantially uniform, all of the particles being encapsulated within the polymer, there being no perceptible quantity of free polymer formed, or uncoated particles.

The process of coating or encasing individual particles of high gas barrier particles in shells of olefin polymer polymerized in situ thereon is preferably carried out by the use of an organometallic-transition metal catalyst system. The components of such a catalyst system, as will be understood by those skilled in the olefin polymer art, react when mixed together to produce a substance or substances highly active as a polymerization initiator for the low molecular weight aliphatic 1-olefins.

Any of the aliphatic 1-olefins having up to 6 carbon atoms may be polymerized in accordance with the present invention. These include the 1-olefins such as ethylene, propylene, butene-1 and the like. These 1-olefins may be used to form homopolymers, or mixtures of them may be polymerized together to form various copolymers. In addition, other compounds which are known to copolymerize with these 1-olefins to form useful products may be employed in combination therewith. It is preferred in the practice of the present invention to use ethylene or propylene which have the outstanding advantages of being gases at ordinary temperatures, of being relatively inexpensive and available in large quantities, and of producing polymers of high molecular weight having very desirable properties.

Catalyst systems which have been found useful in the process of this invention include any system having two or more components which, when mixed together, react to form a material that initiates the polymerization of the 1-olefins. In general, it has been determined that two component systems which are particularly suitable are those which are Ziegler-type catalysts such as those disclosed in Belgian Pat. No. 533,362, the disclosure of which is incorporated herein by reference, in which one component is an organometallic reagent such as an alkyl or aryl compound of one of the metals lithium, sodium, potassium, magnesium, calcium, zinc, cadmium, boron, or aluminum, and the other component is a transition metal compound such as a halide or ester of titanium, zirconium, vanadium or chromium. Other similar catalysts systems, containing two or more components, can be used as will be apparent to those skilled in the art of producing olefin polymers.

It has been further determined to treat the high barrier particles with the catalyst components immediately before addition of the olefin monomer.

In the practice of the invention it is also possible to treat the barrier particles with either one of the components of the catalyst system and then add the other component or components of the catalyst system to the treated particles. The olefin polymer may then be formed by polymerization on the barrier particles as soon as the catalyst components have had an opportunity to react with each other.

The high gas barrier polyolefin material formed in the process of the instant invention is a granular, free-flowing powder, each particle of which has a center or nucleus of high gas barrier resin or mineral particle encased in a shell of olefin polymer. The olefin polymer coats and surrounds the barrier particle.

One simple and convenient way of preparing the olefin polymer coated gas barrier particles is by the slurry method in which the high gas barrier particles are suspended in a suitable liquid medium, such as an organic liquid, which does not react with either the gas barrier particles or the olefin polymer to be formed thereon. The particles are then treated with the catalyst components after being placed in the suspending liquid. The slurry of catalyst treated gas barrier particle in the organic liquid is placed in a closed reaction vessel and the monomer is fed into the vessel at a suitable rate while maintaining the slurry in agitation. Provisions are made to control the temperature of the reaction vessel and the reaction is carried out under anhydrous conditions. As polymerization proceeds, the slurry becomes thicker and reaction is stopped at any desired stage depending upon how much of the polymer is to be formed. The slurry is then removed from the reaction vessel and pressed or filtered to remove the free organic liquid and then washed in water, methanol or other materials which dissolve out the bulk of the catalyst residue. Minor amounts of additives of the type conventionally employed with olefin polymers, such as antioxidants, coloring pigments and the like, may be added to the gas barrier particles before treatment or may be added during polymerization or thereafter.

The polymerization reaction is desirably carried out at atmospheric pressure and over a wide range of temperature. Ordinarily, the polymerization proceeds rapidly at atmospheric pressure and at a temperature between about 20° C. and about 100° C. The amount of polymer formed will vary with the time of the polymerization reaction, the particular catalyst used and the particular monomer or monomers being polymerized. Useful products are obtained by forming olefin polymer on the barrier particles in amounts from about 5% to about 70%, based on the total weight of the particle/olefin polymer composition.

In manufacturing containers from the olefin polymer in situ coated high gas barrier particles of the present invention, it is preferred that the containers be compression molded from a billet and preferably a multilayered billet prepared using the coated particle as one of the layers.

The billet used in accordance with the present invention can be any shape such as circular, square, oval or polygonal. The actual dimensions of the billet will be determined by experimentation with the particular molding chamber and die member configuration and the total volume of the billet will be that which is sufficient to meet the dimensional requirements of the desired container.

A method for preparing the billet is to compact one or more separate layers of resin and mineral powders of different composition, one of which contains the olefin polymer coated gas barrier particle. In preparing a multilayered billet, the layers are formed by alternatively charging and compressing the different powder mixtures of which the billet is to be formed in a compacting chamber first at relatively low pressures, e.g., 200–500 psi, and then at relatively high pressures, e.g., 6,000 to 30,000 pounds per square inch psi, to the desired shape and contour of the billet. Thereafter, the compacted layers are heated to a temperature of about 10° to 175° F. above the melting temperature of the olefin polymer coated particle for a time sufficient to fuse the olefin coated particles. The so-prepared, heated billet is then ready for subsequent compression molding to form the container. Preferably, the molding process used is that which is disclosed in U.S. Pat. No. 4,122,147, the disclosure of which is incorporated herein by reference.

The invention is further illustrated by the following Example.

EXAMPLE

High density polyethylene (HDPE) and polypropylene (PP) coated high gas barrier resins were prepared as follows:

(1) Vinylidene Chloride Copolymer In Situ Coated with High Density Polyethylene

Vinylidene chloride copolymer resin powder having a vinylidene chloride (VDC) content of 95% and a methylacrylate (MA) content of 5% with an average particle size of 184 microns was dried at 25° C. for 12 hours in a vacuum oven. 150 grams of the dried powder was suspended in 1 liter of dry cyclohexane in a round bottom flask. The suspension was deoxygenated by bubbling nitrogen through the suspension with stirring for 12 hours.

To a second reaction kettle was added 500 milliliters (ml.) of decahydronaphthalene. The decahydronaphthalene was deoxygenated by bubbling nitrogen through the liquid with stirring for 12 hours.

An olefin polymerization catalyst was prepared by adding to the decahydronaphthalene 7.5 ml. titanium tetrachloride and 7.5 ml. triethylaluminum solution (25 wt. % in toluene). The temperature of the catalyst suspension was raised to 180°–185° C. and maintained thereat for 40 minutes. The color of the solution turned to deep violet. The solution was then cooled and 300 ml. of cyclohexane was added followed by additional 30 ml. of triethylaluminum solution.

The vinylidene chloride copolymer suspension previously prepared was transferred to the resin kettle using nitrogen pressure. Thereafter ethylene gas was bubbled through the vigorously stirred mixture at a rate of 2 l./min. for 6 hours.

The resultant reaction product was poured with stirring into 1 liter isopropanol acidified with hydrochloric acid. The solid reaction product was washed additionally with methanol and dried at 25° C. in a vacuum oven overnight. The reaction product was a white powder which contained 25% by weight polyethylene and 75% by weight vinylidene chloride copolymer.

(2) Vinylidene Chloride Copolymer In Situ Coated with Polypropylene

The above procedure was repeated to prepare 200 g. dry vinylidene chloride copolymer powder suspended in 4 liters of dry deoxygenated n-heptane.

To a flask was added 500 ml. dry cyclohexane followed by the addition of 3 grams titanium trichloride. The mixture was vigorously stirred under a nitrogen atmosphere and 3 ml. of diethylaluminum chloride was charged to the flask by a syringe. The mixture was stirred for 5 minutes. The vinylidene chloride copolymer slurry was then transferred into the flask by nitrogen pressure. Propylene gas was passed through the mixture at a rate of 2 l./min. for 10 hours. A water cooling bath was placed underneath the flask during the entire reaction.

After the reaction was completed, the reaction product was poured into 1 liter of isopropanol containing some hydrochloric acid with vigorous stirring in a 5 liter beaker. The product was washed additionally with methanol and dried at 25° C. in a vacuum oven overnight. The white powder contained 25 wt. % of polypropylene and 75% by weight vinylidene chloride copolymer.

(3) Polyacrylonitrile (PAN) In Situ Coated with High Density Polyethylene

Polyacrylonitrile (75 microns mean diameter) 200 grams suspended in 200 ml. distilled decahydronaphthalene was charged to a reaction flask and purged with nitrogen overnight. Titanium tetrachloride (25% solution in toluene) 15 ml. and 15 ml. aluminum triethyl was added to the flask. The slurry became brown in color. The flask was then immersed in an oil bath (180° C.) and the temperature was maintained for 40 min., during which time the intensity of the brown color decreased substantially. Another 8 ml. of titanium tetrachloride was added before the reaction flask was cooled to room temperature. To the cooled reaction flask was added 1500 ml. distilled cyclohexane and 70 ml. aluminum-triethyl. The solution attained a deep purple color. Ethylene gas was passed into the solution for about 3.5 hours at which time the medium became difficult to stir. The reaction product slurry was poured into n-propanol: hydrochloric acid (100:0.5 by volume) filtered and washed with methanol to remove the catalyst. The final product was dried under vacuum at 60° C. for 24 hours.

The total weight of the polymer was 255 grams and was composed of 21.5% polyethylene and 78.5% polyacrylonitrile.

The above reaction procedure was repeated using varying amounts of polyacrylonitrile, solvents and catalysts. The reactants, the amounts used and the composition of the polyethylene coated polyacrylonitrile are recorded in Table I below.

TABLE I

| MATERIALS | RUN NO. 2 | RUN NO. 3 |
| --- | --- | --- |
| Decahydronaphthalene | 500 ml | 1000 ml |
| PAN | 75 g | 150 g |
| Aluminum triethyl | 7.5 ml (Initial) | 15 ml (Initial) |
|  | 40.0 ml (Final) | 70 ml (Final) |
| Titanium Tetrachloride | 7.5 ml (Initial) | 15 ml (Initial) |
|  | 4.0 ml (Final) | 8 ml (Final) |
| Cyclohexane | 750 ml | 1500 ml |
| Weight of Coated PAN | 116 g | 250 g |
| PAN | 65% | 60% |
| HDPE | 35% | 40% |

The reaction products from the three separate runs were combined to obtain 620 grams of HDPE coated PAN composed of 30% by weight HDPE and 70% PAN.

Containers were fabricated using the olefin polymer coated polyvinylidene chloride and polyacrylonitrile in the following manner.

Bilayer billets were formed by first feeding to a compacting device, 17.3 grams of a mixture of powders containing 50% by weight polyethylene powder having a density of about 0.95 g/cc and a median particle diameter of about 25 microns and 50% by weight $CaCO_3$ particles having a median particle diameter of about 11 microns to form the lower layer of the billet. To the top surface of the lower layer was applied 16.9-22.7 grams of olefin polymer coated vinylidene chloride polymer containing 50% to 88% by weight vinylidene chloride polymer to form the upper layer of the billet.

Bilayer billets were also formed by first feeding to the compacting device, 19.4 grams of a mixture of powders containing 50% by weight of the polyethylene powder and 50% by weight of the $CaCO_3$ particles to form the lower layer of the billet. To the top surface of the lower layer was applied 14.5-17.2 grams of the polyethylene coated polyacrylonitrile containing 60% to 73.5% polyacrylonitrile to form the upper layer of the billet.

The bilayered articles were compacted at about 6000 psi into 2.5 inch diameter discs having a thickness of about 400 mils. The upper layer had a thickness of about 210 mils and the lower layer had a thickness of about 190 mils. The discs were heated in a heating device to about 350° F. for about 8 minutes under ambient pressure conditions. At the end of the heating period, the heated discs were placed in a compression molding apparatus of the type described in U.S. Pat. No. 4,122,147.

Compression molding of the discs at 40,000 psi was effected with a 30 ton mechanical press to form a flanged bilayer cylindrical hollow container having a flange thickness of 20 mils and a sidewall thickness of 32 mils composed of a polyethylene/$CaCO_3$ outer layer and an olefin polymer coated high barrier resin inner layer and a bottom wall thickness of 35 mils of the same composition as the sidewall. The outer layer was 17 mils in thickness and the inner layer was 15 mils in thickness. The container flange could be double seamed with a steel end closure without fracture.

The oxygen leak rate of the bilayer container was measured by sealing the container to a Mocon Oxtran 100 instrument with 0.5 inch holt melt wax. The oxygen leak rates of the containers are recorded in Table II below.

For purposes of comparison, the procedure of Example I was repeated with the exception that high gas barrier resin particles which had not been in situ coated with an olefin polymer but merely admixed with high density polyethylene or polypropylene were substituted for the in situ coated gas barrier resins used in the preparation of the containers of Example I. The oxygen leak rates of the comparative containers measured in Example I are also recorded in Table II, the comparative containers being designated by the symbol "C".

TABLE II

| Run No. | Olefin Polymer Coated Resin Used In Inner Layer Components | Wt. Ratio | Wt. % Barrier Resin In Total Container | Oxygen Leak Rate $ccO_2/100\ in.^2$ day @ 73° F. Range | Average | No. of Containers Tested |
| --- | --- | --- | --- | --- | --- | --- |
| 1. | HDPE/PAN | 30/70 | 42 | 0.053–0.114 | 0.082 | 3 |
| 2. | HDPE/VDC—MA | 25/75 | 52 | 0.010–0.013 | 0.0115 | 4 |
| 3. | PP/VDC—MA | 25/75 | 52 | 0.005–0.011 | 0.008 | 2 |
| $C_1$ | HDPE/PAN | Mixture | 48 | 0.205–0.220 | 0.212 | 6 |
| $C_2$ | HDPE/VDC—MA | Mixture | 52 | 0.022–0.046 | 0.034 | 3 |
| $C_3$ | PP/VDC—MA | Mixture | 52 | 0.008–0.019 | 0.012 | 5 |

It is immediately apparent from an examination of the data recorded in Table II above that containers compression molded using polyethylene or polypropylene in situ coated on high gas barrier resins have appreciably improved gas barrier properties when compared with containers compression molded from polyethylene and polypropylene physical admixtures with these same gas barrier resins.

What is claimed is:

1. A process for the manufacture of polyolefin containers having substantially lowered permeability to oxygen and suitable for the packaging of foodstuffs requiring an extended shelf-life which comprises polymerizing an olefin monomer in the presence of a solid material selected from the group consisting of vinylidene chloride polymers, acrylonitrile polymers, nylon and, vinyl alcohol polymers having a permeability to oxygen which is less than an olefin polymer to prepare an olefin polymer coated material, forming a billet from the olefin polymer coated material and then compression molding the billet into a hollow container having walls formed from the olefin polymer coated material, which exhibit lowered permeability to the transmission of gases.

2. The process of claim 1 wherein the olefin monomer is ethylene.

3. The process of claim 1 wherein the olefin monomer is propylene.

4. The process of claim 1 wherein the solid material is a vinylidene chloride polymer.

5. The process of claim 1 wherein the solid material is a copolymer of vinylidene chloride and methyl acrylate.

6. The process of claim 1 wherein the solid material is an acrylonitrile polymer.

7. The process of claim 1 wherein the solid material is polyacrylonitrile.

8. The process of claim 1 wherein the polymerization of the olefin monomer is catalyzed by a combination of an organometallic and a transition metal compound.

9. The process of claim 1 wherein the olefin monomer is catalyzed by a combination of an aluminum alkyl compound and a titanium halide.

* * * * *